UNITED STATES PATENT OFFICE.

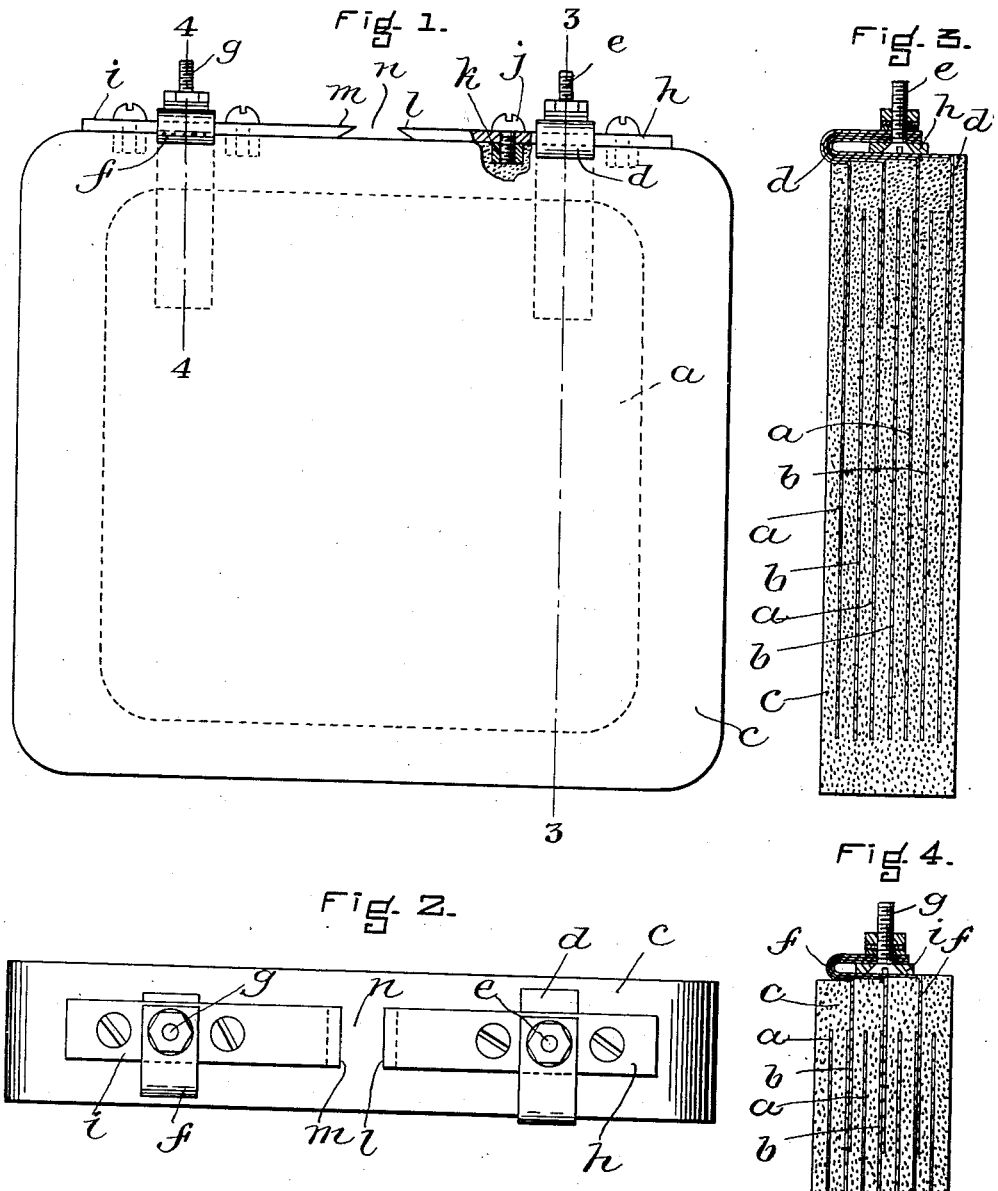

WILLIAM J. MURDOCK, OF EVERETT, MASSACHUSETTS.

CONDENSER.

1,174,600.

Specification of Letters Patent.

Patented Mar. 7, 1916.

Application filed February 7, 1911. Serial No. 607,196.

*To all whom it may concern:*

Be it known that I, WILLIAM J. MURDOCK, of Everett, in the county of Middlesex and State of Massachusetts, have invented certain new and useful Improvements in Condensers, of which the following is a specification.

The present invention relates to an electrical condenser adapted for any purpose to which a condenser may be put, but having especial reference to and particular design for use in the art of radiotelegraphy, in which present practice prescribes the employment of electrical energy at a comparatively high potential and at a markedly high frequency.

The definite objects of the invention are: (*a*) to produce a simple, convenient, and inexpensive electrical condenser suited for use with high potential and high frequency electrical energy, smaller in bulk in comparison to its electrical capacity than the condensers ordinarily employed: (*b*) the production of an electrical condenser suited for use in connection with electrical energy of high potential and high frequency, of a nature such that the internal losses in operation are reduced to a minimum: (*c*) the production of an electrical condenser adapted for use in connection with electrical energy of high potential and high frequency, of such a nature that the material in which the electrical strain is produced is strengthened physically and electrically by so associating the various parts that the resulting material is practically a unit. These objects are realized: (*a*) by the employment of a specially prepared dielectric material in association with the necessary conductors, and (*b*) by the construction of the entire condenser with particular reference to the formation of the dielectric material therein, as a unit solid, every part of which is essentially, practically, and permanently integral with every other part thereof.

In the drawing accompanying this specification, I have illustrated a condenser in which the principles of my invention are embodied and by which the objects above noted are carried into effect. It is to be understood that the condenser may be made in any form and that the particular form here illustrated is not essential, but is shown merely for illustration.

Figure 1 represents a side elevation of the condenser. Fig. 2 is a plan view of the same. Fig. 3 is a section on line 3—3 of Fig. 1. Fig. 4 is a section on line 4—4 of Fig. 1.

The novel features of this invention whereby I secure the desired results are hereinafter specified. I preferably employ a dielectric material composed of mica in a pulverulent or a granular state, intimately associated by a mechanical method of mixture with a binding gum of a resinous nature, the combination being such that at a relatively high temperature the material is plastic, is adapted to manipulation, formation, or compression at the pleasure of the operator, and at the lower temperatures, assumes physical characteristics similar to those of most solids. The statement that I employ a combination of granular mica and a resinous gum, capable of becoming plastic at a certain temperature is not intended to be a limitation of the invention. The use of any substance which may be pulverized, and which possesses the properties of an electrical dielectric, in combination with any material possessing similar electrical properties, and capable of assuming a plastic nature upon the application of heat, so that it may be manipulated, formed or compressed, may be considered within the scope of this invention. The original feature here noted consists in the use of the specified combination, or of similar combinations, as a dielectric material in an electrical condenser adapted to high potential and high frequency oscillations of electrical energy. This material is formed into plates, which, in the finished condenser are put under compression, as later described. By such compression of the dielectric material I secure such intimate association of the ultimate particles of the original matter, that the nature of the matter is changed with reference to its power of withstanding the disruptive forces of the electrical strains to which it is subjected in operation, thus making possible the safe use of less bulky layers than would be possible in dielectric material of this nature not similarly treated.

I distinguish here between the use of the material which I specify as a dielectric and similar materials employed as non-conductors. It is to be noted that in a condenser adapted for the production of high frequency oscillations, the dielectric material must be such that it is capable of transmitting through its ultimate particles, electrical energy at high potential in oscillatory form, imparted by the application of a suitable electric stress to metallic conductors connected to the alternate conducting layers of the condenser. The act of transmitting electrical energy, which dielectric materials possess, depends upon the production of a state of electric strain within the dielectric, said strain being a condition, definitely different from the state ordinarily characterized as non-conductivity. Thus, the process of creating the state of strain, and the use of electrical expedients for the removal of said strain, implies a distinct and an individual use of the dielectric material, connoting the production of definite force lines within the dielectric, which force lines in their actions and interactions are adapted to the formation of electromagnetic waves of known characteristics suitable for use in radiotelegraphy. It may therefore be maintained that the employment of the specified material as a dielectric in a condenser suited for the production of electromagnetic waves used in radiotelegraphy is an undoubtedly novel, and a hitherto uncontemplated use of such material distinctly different from the customary use of insulating materials in the electrical arts as non-conductors.

The common practice in the manufacture of the more widely used condensers implies the interleaving of the dielectric sheets with separated or separable conducting media, or conversely. By my method, I produce in one operation, a necessary component of the condenser, comprising the necessary conductive material practically united to and embedded in the dielectric material in such a fashion that the association between the dissimilar members is most intimate, and consequently most efficient, the requirements of a good condenser stipulating a most intimate contact of the dissimilar members.

In the drawing $a$ and $b$ represent the electrically conductive sheets, of opposite sign respectively, which may be metallic plates, sheets of foil, wires, ribbons, or net work, or may have any other suitable form, and are termed "sheets" for the purpose of description and not of limitation. The dielectric is indicated by $c$. Conductors $d$ lead from the sheets $a$ beyond the boundaries of the condenser into connection with a binding post $e$, and similar conductors $f$ lead from the sheets $b$ to a binding post $g$ of opposite polarity. Said conductors may be, and preferably are, wires, strips, or ribbons laid against the sheets, but they may be integral tongues or extensions of the sheets. They may also be of any desired length and led in any desired way to the binding posts, which may be located wherever desired. $h$ and $i$ represent metal plates in conductive connection with the conductors $d$ and $f$, respectively, and secured to the condenser by any desired means, as screws $j$ and nuts $k$. The ends $l$ and $m$, adjacent to one another, of these plates are adapted to constitute terminals or poles between which is an air gap $n$. The width of this gap may be made such that the condenser will be discharged between the terminals before disruption of the dielectric can occur.

In the manufacture of a complete condenser, I assemble a sufficient number of dielectric plates and layers or sheets of conducting material in alternation to secure a desired electrical capacity, at the same time placing suitable electrical conductors in contact with predetermined conductive layers, in such a manner that the said conductors protrude beyond the plates of dielectric material, and form suitable terminals for the oscillatory condenser circuit. I then subject the collection of plates and sheets to a temperature sufficient to render the dielectric material plastic. The entire collection is then subjected to great pressure, being for that purpose inclosed within a suitable mold, said pressure having two main results: (1) reducing the bulk of the collection of plates or sheets, and (2) rendering the contiguous dielectric plates, in the special localities where they are in contact, a practical unit, at the same time effecting a merging or a coalition of contiguous particles throughout the entire dielectric material, in such a way that each and every particle is placed in close connection and in apposition with each and every contiguous particle of the entire dielectric. Thereby the edges of the adjacent dielectric plates extending beyond the associated conductive sheets are welded together, and the sheets are thus enveloped and surrounded by a unit mass of dielectric material without cracks or spaces or even portions of less dielectric strength adjacent to the planes of the sheets; with the result that the tendency to "brush" electrical discharges (which occur with high frequency electrical oscillatory energy from exposed conductors having thin edges) is checked and nullified, and the internal losses in the condenser from such discharges are reduced to the minimum.

I have found that the condensers resulting from this method of manufacture possess qualities which give them a distinct advantage over many other forms employed in the transmitting equipment of radiotelegraphic stations. My condensers are, capacity for capacity, smaller in bulk than any other condensers made in the desirable rectangular plate form which have come to my knowledge. Capacity for capacity, they occupy approximately one-fourth the space of the ordinary and most commonly used Leyden jar equipment, and one-third that occupied by glass plate condensers of like purpose. An advantage beyond mere reduction in bulk lies in the physical strength of the completed condenser, which renders it superior to forms employing glass as a dielectric, particularly on ships where the likelihood of accidental breakage is the maximum, my condenser being practically unbreakable by ordinary means and therefore not requiring a case of any kind to protect it against breakage. The two advantages pointed out are incidental to a more important advantage, namely, that my condenser shows a minimum of internal losses in operation, the ratio experimentally determined between mine and some of the leading types now in use being as low as one to four. Further advantages, which have been heretofore noted in the preparation of electrical condensers are also presented in my product, namely, in the increase of capacity resulting from the application of pressure, and the increase in dielectric resistivity to the disruptive tendencies of the electric strain permeating the dielectric during the operation of the condenser. A last advantage may be noted that the dielectric which I employ is plastic in the commercial sense that it may be readily modeled, molded, formed, or compressed, and is thus suited for the speedy and ecomonical production of efficient condensers by the simplest processes.

What I claim and desire to secure by Letters Patent is:

1. An electrical condenser comprising a plurality of layers of electrically conductive material embedded in an enveloping dielectric material, said dielectric material being a solid and under molecular compression at the temperatures to which the condenser is subject in use, and being plastic at materially higher temperatures, said condenser being totally a self-sustaining solid possessing intrinsic properties of density, hardness, tenacity, and cohesion, and requiring no external confining means.

2. An electrical condenser having an enveloping dielectric material, a plurality of conductive layers alternately disposed with masses of said material, and protruding connection conductors held in contact with said layers by the intrinsic cohesive qualities of the enveloping dielectric material, said protruding conductors being permanently united to their respective conductive sheets thereby.

3. An electrical condenser having a plurality of layers of electrically conductive material embedded in an enveloping dielectric material, said dielectric material being a mechanical and chemical product of a mineral powder, and a vegetable gum, said combination of materials possessing dielectric properties and being capable of assuming a unit self-sustaining solid form of great cohesion, tenacity, and hardness upon successive applications of heat, pressure and cooling.

4. In a condenser, a unified, solid dielectric substance, between and around the several conductive layers, said dielectric substance being the compressed product of a plastic mixture of a mineral powder, and a vegetable gum, substantially as described.

5. An electrical condenser comprising a plurality of layers of electrically conductive material and layers or plates of dielectric material, said conductive and dielectric layers being arranged in alternation with the conductive material embedded in the dielectric, and the dielectric layers being merged or welded together beyond and around the edges of the conductive layers; said dielectric material being an intimate association or mixture of mica in a granular state with a binding gum of a resinous nature, and being in such permanent state of compression that its dielectric strength is augmented.

6. An electrical condenser comprising an alternating series of conductive sheets and dielectric plates, said plates being of greater superficial area than said sheets and extending beyond the boundaries of the latter in all directions; said dielectric plates being of material which is plastic at temperatures higher than those encountered by the condenser when in use, and is capable of compression and condensation when in the plastic state, and has greater electrical strength when in the compressed condition; such material being hard at the temperatures encountered by the condenser in use, and having such inherent cohesion and tenacity in the hard state as to retain the compression imposed upon it in the plastic state and to remain hard at high atmospheric temperatures and to be tough at low temperatures; said dielectric plates being under high compression and being welded together in the finished condenser.

In testimony whereof I have affixed my signature, in presence of two witnesses.

WILLIAM J. MURDOCK.

Witnesses:
   ARTHUR H. BROWN,
   P. W. PEZZETTI.